June 17, 1930.　　　　A. P. NUTE　　　　1,764,465
PISTON
Filed July 30, 1928
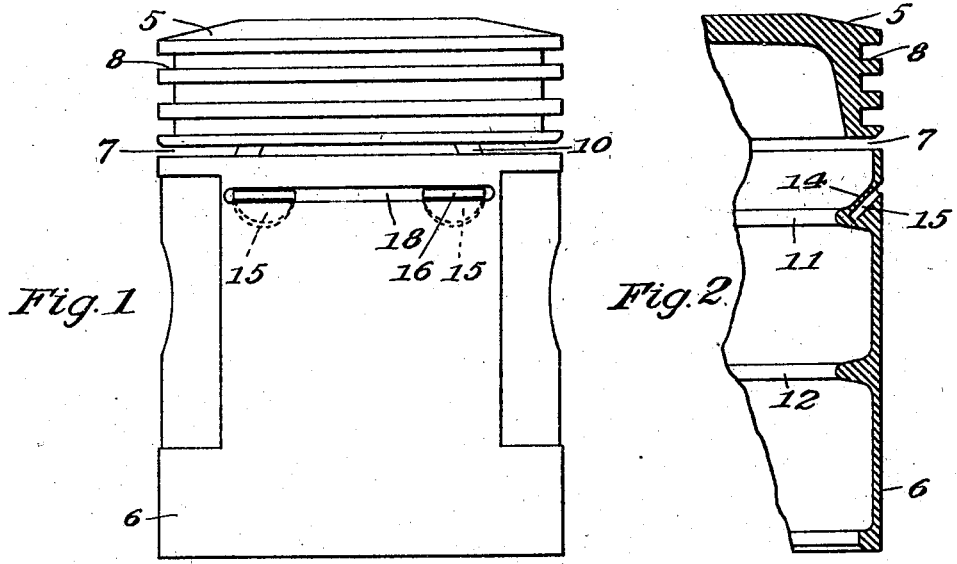
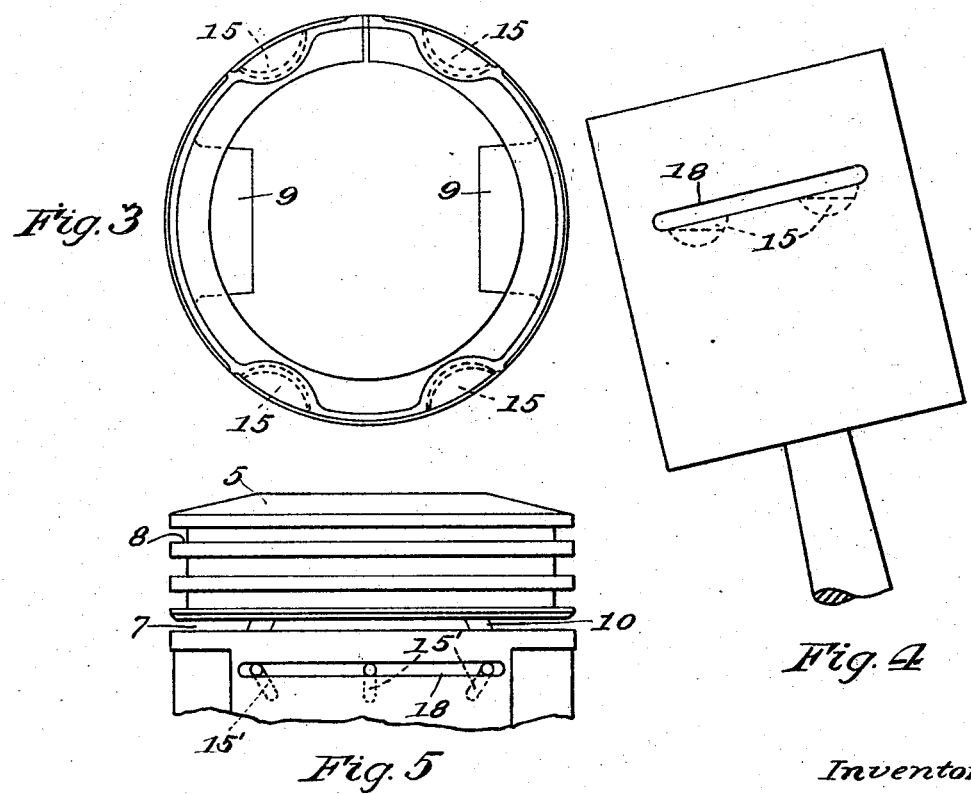
Inventor:
Arthur P. Nute
By Macleod, Calver, Copeland & Dike
Attorneys.

Patented June 17, 1930

1,764,465

UNITED STATES PATENT OFFICE

ARTHUR P. NUTE, OF SEATTLE, WASHINGTON

PISTON

Application filed July 30, 1928. Serial No. 296,305.

This invention relates to pistons for internal combustion engines for motor vehicles, aviation and marine work and has for its object the provision of a piston which will retain and supply lubricant between the thrust surfaces of the piston and the cylinder walls when the engine is started and before the normal lubrication of the engine is established.

When an internal combustion engine is permitted to stand idle the lubricant drains into the crank case leaving the cylinder walls free of lubricant and dry. If the engine is started the pistons are thrust up and down against the cylinder walls without lubricant until the normal lubrication of the engine is established. This causes more damage to the pistons and cylinder walls than is caused by normal running of the engine for long periods. In order to overcome this difficulty it has been suggested to provide an annular groove in the wall of the piston to retain a supply of lubricant which will be available when the engine is started. Such a groove has not been satisfactory because the lubricant retained therein drains out if the vehicle is stopped while in an inclined position.

In accordance with the invention one or more lubricant retaining pockets are provided adjacent each thrust surface of the piston. These pockets are arranged with side and end walls and a bottom and an opening adjacent the thrust surface of the piston to trap lubricant regardless of the tilt of the engine in any direction. Preferably, each pocket is inclined upwardly and outwardly and communicates with a groove extending in a peripheral path across the thrust surface of the piston.

The invention will be more clearly understood from the following description in conjunction with the accompanying drawings; in which, Fig. 1 is an elevational view of a piston embodying the invention.

Fig. 2 is a sectional elevational view through one of the oil retaining pockets.

Fig. 3 is a plan view looking from the bottom of the piston.

Fig. 4 is an elevational view of the piston showing the oil retained in the pockets when the piston is tilted, and Fig. 5 is an elevational view of a portion of a piston embodying the invention in modified form.

A piston is illustrated in the accompanying drawings embodying the invention comprising a piston head 5 and a piston skirt 6 which is completely separated from the head, in so far as its circumferential wall is concerned, by an annular slot 7. The head 5 has the usual ring grooves 8 and is turned to a slightly smaller diameter than the skirt in accordance with common practice. The skirt 6 has two diametrically opposite wrist pin bosses 9 which are united at their inner ends with two upright supports 10 that are connected with the head 5 at points inwardly from the periphery of the same. The skirt 6 is provided with internal ribs 11 and 12 for stiffening the same.

In accordance with the invention the rib 11 is connected with the skirt 6 by a relatively large fillet 14 in which are provided one or more pockets 15, preferably extending downwardly and inwardly, and having a mouth the width of which measured on the periphery of the piston is small in comparison with the periphery of the piston. These pockets may be segmental in shape as shown in Figs. 1 to 4 inclusive being formed by a Woodruff key cutter or they may be made by drilling holes 15′ in the fillet as shown in Fig. 5. In accordance with the preferred practice of the invention the pockets open into a horizontal groove 18 extending in a peripheral path across a thrust surface of the piston.

When the piston of the invention is assembled in an internal combustion engine and the engine is stopped, the lubricant upon the cylinder walls accumulates in the groove 18 and drains down and fills the pockets 15. When the engine is again started the lubricant thus trapped in the pockets 15 is thrown up spreading out in the groove 18 against the cylinder walls and thereby furnishing lubrication between the thrust surface of the piston and the cylinder walls until the normal lubrication of the engine is established. It will be noted, as illustrated in Fig. 4, that regardless of the angle at which the engine stands the lubricant trapped in the pockets 15 cannot drain out, and therefore there is always available sufficient oil to give the walls a preliminary lubrication. My invention therefore overcomes the danger of dry cylinder walls which occurs when an engine stands, and adds very greatly to the life of the engine. This is accomplished at practically no expense since pistons embodying my invention cost little or no more than those of standard construction.

What I claim is:

1. A piston for an internal combustion engine having a deep lubricant retaining pocket extending from a thrust surface of the piston, the width of the mouth of said pocket measured on the periphery of the piston being small in comparison with the periphery of the piston.

2. A piston for an internal combustion engine having a deep luricant retaining pocket extending inwardly and downwardly from a thrust surface of the piston, the width of the mouth of said pocket measured on the periphery of the piston being small in comparison with the periphery of the piston.

3. A piston for an internal combustion engine having a deep lubricant retaining pocket extending from a thrust surface of the piston, the width of the mouth of said pocket measured on the periphery of the piston being small in comparison with the periphery of the piston, and a groove extending in a peripheral path across a thrust surface of the piston and communicating with said pocket.

4. A piston for an internal combustion engine having a deep lubricant retaining pocket extending inwardly and downwardly from a thrust surface of the piston, the width of the mouth of said pocket measured on the periphery of the piston being small in comparison with the periphery of the piston, and a groove extending in a peripheral path across a thrust surface of the piston and communicating with said pocket.

In testimony whereof I affix my signature.

ARTHUR P. NUTE.